Patented Aug. 19, 1952

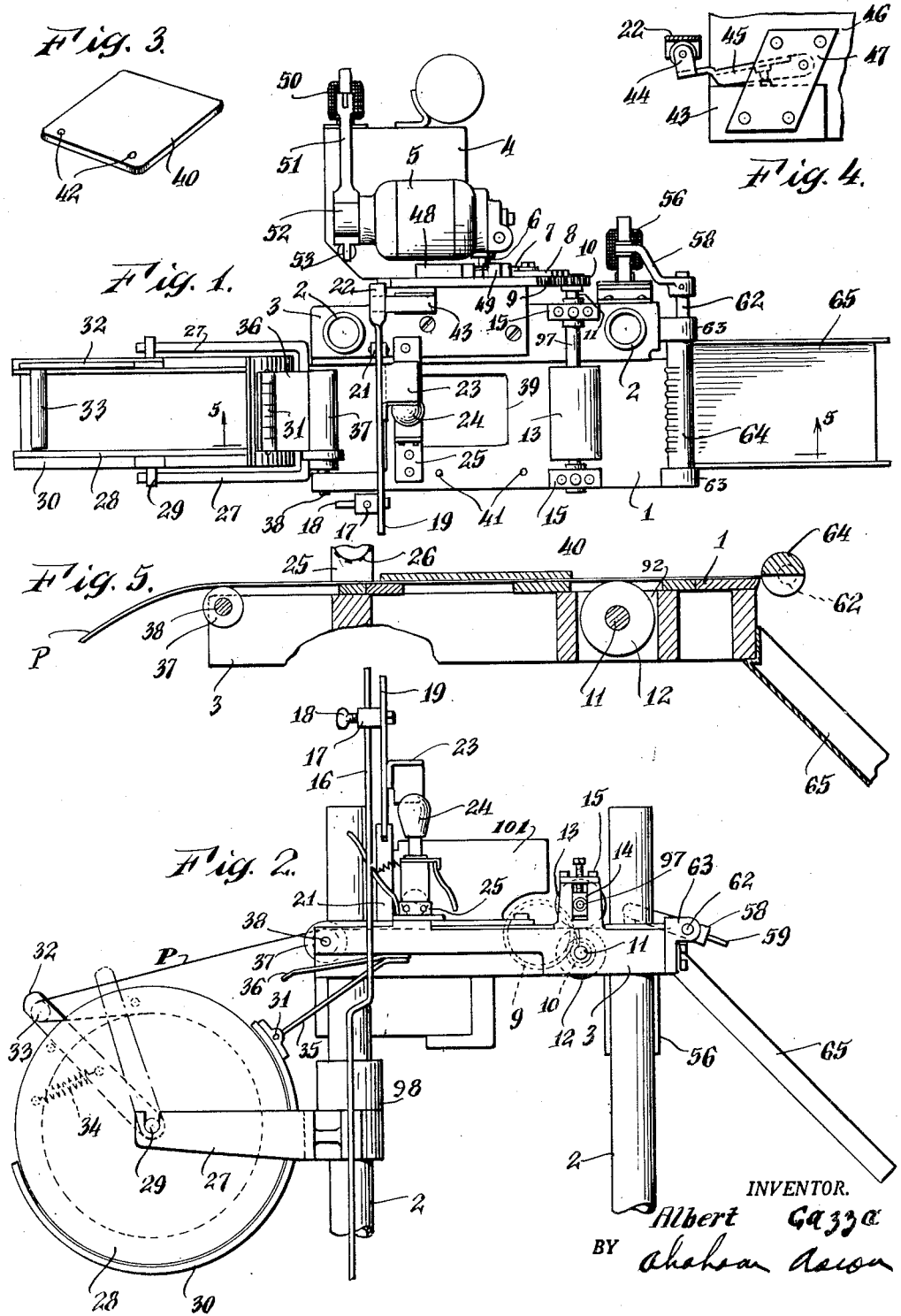

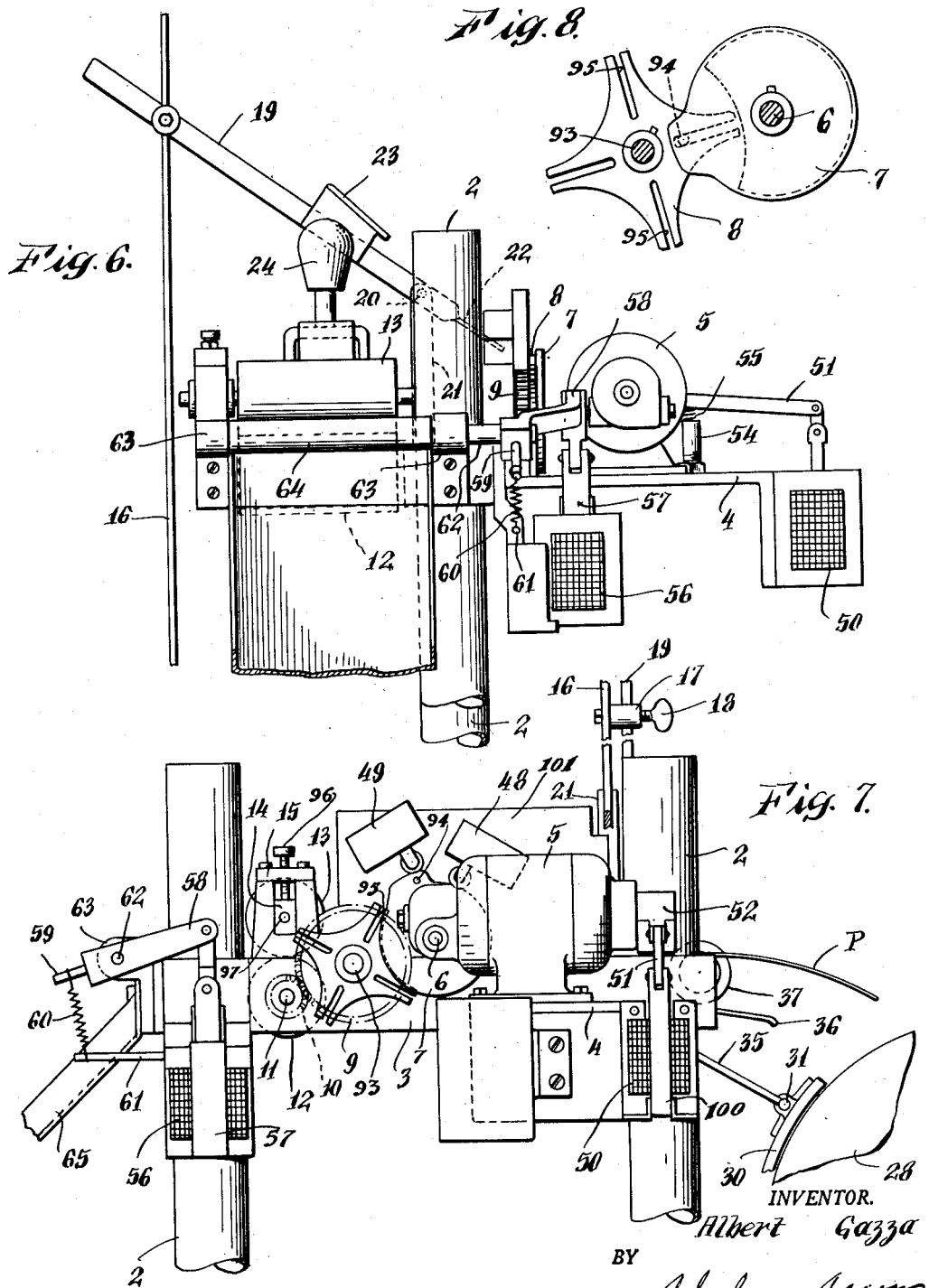

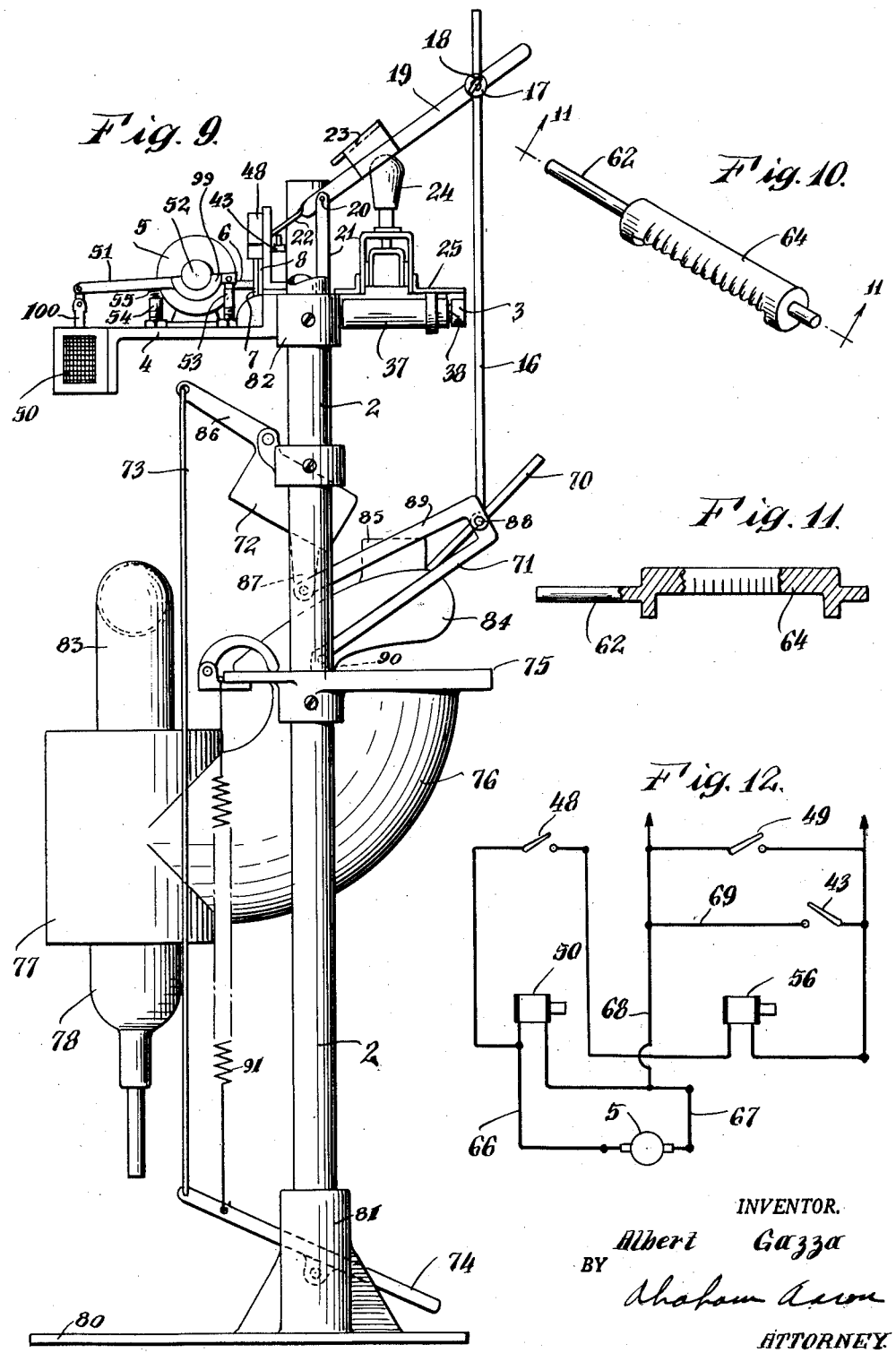

2,607,264

UNITED STATES PATENT OFFICE 2,607,264

PHOTOGRAPHIC PRINTING DEVICE

Albert Gazza, Brooklyn, N. Y.

Application March 23, 1949, Serial No. 83,063

2 Claims. (Cl. 88—24)

This invention relates to improvements in photographic printing devices and has for an object the provision of a mechanism for supporting and conveying a strip or web of photographic paper along a plane, a frame having an aperture therein adjacent to said plane, means to impress a latent photographic image in the emulsion on said strip via said aperture while the strip is at rest, means to advance said strip to a cutting position, and a cutter for severing the portion of the strip containing said latent image with a deckle-edge.

In the prior art where a series of latent images is impressed in a strip of sensitized paper, said images being produced from negatives of various densities, it has been found that it is impossible to obtain uniform results in the development of the latent images because of the varying densities of negatives, particularly those produced by amateurs. Therefore, it was found to be expedient to sever the several portions of the strip bearing latent images from each other and from the strip so that each one could be developed individually.

The device disclosed herein is devised particularly for processors who handle amateur work, and this machine enables them to get as near uniform and constant results as possible and at the same time to provide the prints with ornamental or deckle-edges.

The machine includes an upper portion in which the surfaces are generally horizontal for supporting a roll of sensitized paper, for advancing the paper along a plane surface thereof which contains an aperture, and means to stamp a date on the side which does not contain the emulsion. In this machine the emulsion side of the strip faces downwardly, and the aperture is below the paper strip so the date is impressed on the upper face of the paper.

Now since there are many of the so-called "candid" type cameras which employ narrow films and consequently which make small negatives, and since the amateur photographer wants larger prints than the negatives the machine includes a projector or enlarger. The negatives are inserted in this projector and are projected optically through the aperture. The projector is carried on vertical tubular shafts, and it may be raised or lowered along these shafts in accordance with the magnification desired. In other words, if the negative is on 35 mm. film and the pictures are wanted to be the full size of the aperture the projector would be positioned lower on the vertical shafts than it would be if the size of the negative were larger.

Other objects of the invention will be apparent to those skilled in the art upon a study of this specification and the accompanying drawings.

Referring to the drawings which are given by way of example to illustrate the invention:

Figure 1 is a plan view of my new and improved photographic printer;

Figure 2 is a front elevation of the upper portion of my photographic printer;

Figure 3 is a cover plate for the exposure aperture;

Figure 4 is a view showing a momentary switch employed in my printer;

Figure 5 is a longitudinal section taken on the line 5—5 of Figure 1 and showing the cover plate in position over the aperture;

Figure 6 is an enlarged end elevation as seen from the right end of Figure 1;

Figure 7 is an enlarged rear elevation of the upper portion of my printer;

Figure 8 is a detailed view showing the Geneva movement;

Figure 9 is a side elevation of the entire machine as seen from the left side of Figure 1;

Figure 10 is a perspective view of the movable element of my rotary deckeled cutter;

Figure 11 is a view partly in section of the rotary cutter shown in Figure 10; and Figure 12 is a circuit diagram of the electrical circuits in the machine exclusive of the circuits to the projector per se.

Referring first to Figures 1, 2 and 9, a base 80 has spaced tubular bosses 81 extending vertically. Positioned in and secured in these bosses are vertical tubular columns 2. A table 1 has formed integral therewith tubular bosses 82 which are secured to the columns 2. A platform 3 extends rearwardly from the table 1 and supports a motor bracket 4. An electric motor 5 is supported on the bracket 4.

Spaced below the table 1, and having tubular bosses thereon engaging the columns 2, is a projector table 75 of a photographic projector or enlarger, which includes a condenser housing 76, communicating with a lamphouse 77 and a suitable aperture (not shown) in the table 75. Supported in the lamphouse 77 is an adjustable lamp socket 78, and extending upwardly from the lamphouse is a ventilating pipe 83.

The table 75 has an offset extension 84 which overhangs the aperture in the table 75 and carries a tubular portion 85 provided to support a suitable objective lens.

Pivotally supported on one of the columns 2 is a box 72 which contains a mercury switch for controlling the supplying of current to the lamp in the lamphouse 77. The box 72 has an upwardly extending lever 86, and a downwardly extending lever 87. A plate 70 has its lower end pivotally carried on the extension 84 and carries midway one of its ends, a horizontally extending stud 88. An L-shaped lever 89 has one end fulcrumed on the stud 88. A similar lever 71 has one end fulcrumed on the stud 88 and its other end is journaled on a stud 90 carried on the extension 84.

A foot pedal 74 is pivotally supported on the base 80 between the tubular bosses 81 and is urged in a clockwise direction, as seen in Figure 9, by means of a spring 91 having one end connected to the pedal and the other end connected to the table 75. A rod 73 has one end pivotally connected to the pedal 74 and the other end pivotally connected to the lever 86. A rod 16 has its lower end connected to stud 88 on the side of the plate 70. The other end of the rod 16 extends through a cross-hole formed in a boss which is pivotally carried on a lever 19 (to be presently described) and is clamped therein by means of a wing screw 18.

Now, when the foot pedal 74 is depressed, the rod 73 pulls the lever 86 downwardly and causes the boss 72 to swing to a horizontal position, thereby closing the switch therein and supplying current to the lamp in the lamphouse 77. As the box 72 is moved as aforesaid, the lever 87 swings therewith and swings the plate 70 in a clockwise direction about its pivots. This causes the stud 88 to move downwardly, thereby pulling the upper end of the lever 19 downwardly. Thus the operator gets the projector going, and at the same time gets into operation mechanism and circuits which will now be described.

The lever 19 has a fulcrum 20 on an upright 21 on the platform 3, and has its lower end 22 twisted so as to be able to present a flat surface to the movable stem of a momentary contact switch 43. The lever 19 also carries an offset lug 23 which is adapted to actuate the plunger handle 24 of a conventional numbering or dating machine, the base 25 of which clears the upper surface of the table 1 along which the photographic paper passes face down, so that a number or a date may be impressed on the upper or non-emulsion surface of said paper.

Referring now to Figures 1, 5 and 7, a depression or well 92 is formed in the table 1, and a roller 12 is positioned therein with its periphery substantially level with the upper surface of the table. The roller 12 is fixed on a shaft 11 journaled in aligned bearing holes formed in members 1 and 3, and extends through the rear wall of platform 3 and carries, on its outer end, a pinion 10. A Geneva wheel 8 is secured on a shaft 93 which is journaled in suitable bearings (not shown) in the platform 3, and carries fixed thereon, a spur gear 9 which meshes with the pinion 10.

The motor 5 carries a reduction gear from which a shaft 6 extends, and this shaft has secured thereto a Geneva rotor 7 having an actuating pin 94 which cooperates with slots 95 in the rotor 8 for moving the latter in increments or steps.

Now, since the gear 9 is keyed on the shaft 93 it rotates in increments also and in turn rotates the pinion 10, the shaft 11 and the roller 12.

Spaced stanchions 15 are mounted on the table 1 and the platform 3 respectively. These stanchions have vertical slots formed therein to contain the bearing blocks 14, and the upper ends of these stanchions are capped with a cross-member which carries a pressure screw 96. Journaled in the bearing blocks 14 is a shaft 97 upon which is mounted a roller 13 which cooperates with the roller 12 to feed the photographic paper along the surface of the table 1.

The table 1 has an aperture 39 formed therein which faces the objective lens of the projector or enlarger below and defines the size of the picture impressed in the emulsion of the photographic paper strip P. Extending upwardly from the surface of the table 1, preferably parallel to one edge of the aperture 39, are spaced guide pins 41 (Figure 1), and a pressure plate, such as the plate 40 shown in Figure 3 and having spaced guide holes 42 therein, is positioned over the aperture 39 with the guide holes 42 engaging the guide pins 41, after the photographic paper strip has been threaded into the machine, as will presently be described, and this plate flattens at least that portion of the paper which spans the aperture 39 and which receives the projected image.

Referring again to Figures 1 and 2, spaced bracket members 27, 27 have a tubular boss 98 which is mounted on the tubular column 2. These spaced brackets have aligned notches adjacent to their outer ends to accommodate the shaft 29 of a roll 28 of photographic paper. A guard 30 supported on the brackets 27 has pivoted thereto a lever 32 which constitutes what is called a "slack arm" and which carries on its outer end a free roller 33. The slack arm is urged in a counterclockwise direction (as seen in Figure 2) by means of a spring 34. The photographic paper P is passed from the roll about the roller 33, and then it passes onto the surface of the table 1 over a free roller 37 which is set into a depression formed in the end of the table 1 and which is freely rotatable on a shaft 38. The end of the paper is threaded beneath the dating machine 24, and thence between the drive roller 12 and the free roller 13, and from these rollers it passes on to the end of the table where it encounters a knife, which will be presently described.

A plate 35 has one end secured to the lower surface of the table 1 and its other end is secured to the guard at the point 31. In some instances it has been found desirable to have an additional light guide 36 extending from the lower surface of the table between the paper end of the plate 35.

Referring now to Figures 1, 6 and 9, the motor 5 carries a brake drum 52 which is normally engaged by an arcuate brake liner 99 carried by a lever 51 which is pivotally connected to an adjustable boss 53. A socket 54 mounted on the motor bracket 4 carries an upstanding spring 55 which normally urges the brake lever 51 upwardly. Operatively connected to the outer end of the brake lever 51 is the plunger 100 of a solenoid 50. The solenoid is connected in multiple with the motor 5 so that whenever current is supplied to the motor it energizes the solenoid and releases the brake.

Carried by the table 1 and the platform 3 are uprights 63 having aligned bearing holes formed therein in which the shaft 62 of a rotary knife 64 are journaled. This rotary knife is shown in perspective in Figure 10 and in section in Figure 11, and it will be noted that the cutting edge is serrated and that the extreme right end of the table 1 is a blade the edge of which is also serrated to mate with the serrations in the knife so that the strips of exposed photographic paper cut off by the knife 64 will have irregular or so-called "deckled" edges.

A crank member 58 is secured onto the shaft 62 of the knife by means of a pin 59, for example, and a spring 62 has one end connected to the pin 59 and the other end is connected to a stud 61 carried by a depending extension of the platform 3. The purpose of this spring is to constantly urge the knife to its normal position where the photographic paper may pass between it and the surface of the table 1. The crank 58 is operatively connected to the plunger 57 of a solenoid 56. This connection may best be seen in Figures 6 and 7.

A vertical plate 101 (Figure 7) forms a support for switches 48 and 49 which have rollers cooperating with the cam surface of the Geneva actuator 7 for controlling circuits to be presently described.

A chute 65 is secured to the right end of the table 1 (Figures 1 and 2) to receive the strips of photographic paper as they fall in front of the knife.

Referring now to Figure 4, the switch 43, which was described as a momentary contact switch, has a lever 45 which actuates a plunger in the switch 43. The lever 45 carries a U-shaped bracket 44 which in turn supports a roller which is engaged by the portion 22 of the lever 19.

Referring to Figure 12, which shows the electrical circuits in the device exclusive of the projector lamp circuit, it will be noted that the solenoid 50, which when energized releases the motor brake, is connected in parallel with the motor so that it receives energy as long as the motor is receiving energy. The momentary contact switch 43 and the switch 49 are connected in parallel so that one terminal of each is connected to one side of the source of supply and one terminal of each are connected together and to a common wire connecting one terminal of the solenoid 50 to one terminal of the motor 5. The other terminal of the motor 5 and the other terminal of the solenoid 50 are connected to the other side of the source of current.

When the machine is stopped at the end of an operation the cam surface of the Geneva member 7 cams the switch 49 open, thereby interrupting current flowing to the motor and to the solenoid 50. After the machine stops the cam on the member 7 continues to hold the switch 49 open. Therefore, some other means was necessary to get the motor started so that the lobe on the cam would allow the switch 49 to close. This means is the momentary contact switch 43 which is actuated by the portion 22 of the lever 19 described above. As soon as the switch 43 is closed the motor starts running, and by the time the switch 43 opens again the switch 49 is closed, and the motor is in operation and continues to run until the cam 7 opens the switch 49.

The solenoid 56 for operating the knife 64 has one terminal connected to one side of the source of current, and the other terminal is connected to one terminal of the switch 48. The other terminal of the switch 48 is connected to the opposite side of the source of current so that when the switch 48 is closed the solenoid 56 is energized, and a cutting operation is thereby effected.

The cam 7 actuates the switch 48 when the lobe on the cam engages the roller on the switch 48, as seen in Figure 7, for initiating the cutting operation.

Although I have herein shown and described by way of example one way of practicing the invention, it will be understood that I am not limited to the exact details of the arrangement shown and described, as many variations may be made within the scope of the following claims.

What I claim as new and novel is:

1. In a device of the character described, a main body having a horizontal support thereon along which a strip or web of photographic paper with the emulsion side down may pass, an exposure aperture in said support, roller means engaging said strip for advancing it along said support, a Geneva movement for driving said roller means, thereby causing said strip to be advanced in steps, means below said support and directed upwardly for impressing a latent photographic image onto said emulsion via said aperture while said strip is at rest, means for imprinting an identification symbol on the face of said web opposite the face in which said photographic image is impressed, a serrated stationary blade mounted on said body at one end of said support and extending laterally of said strip, said blade being spaced from said aperture a predetermined distance, a rotary blade pivotally carried on said support in cooperative relation with said stationary blade and normally disengaged therefrom, said rotary blade having serrations formed therein to match the serrations in said stationary blade, solenoid means for arcuately moving said rotary blade into engagement with said stationary blade, an electrical circuit for said solenoid including a pair of normally open contacts, cam means moving in time with the rotary element of said Geneva movement for closing said contacts to effect the energizing of said solenoid and the shearing off of a portion of said strip containing said image, an electric motor for driving said Geneva movement and consequently said roller means, a spring-loaded brake on the shaft of said motor, a second solenoid in parallel with said motor and operatively connected to said brake, and a circuit between said motor and said second solenoid and a source of current, said circuit including a momentary contact switch and a second switch controlled by said cam means and adapted to be closed by said cam means after said momentary contact switch has initially energized said motor and said second solenoid.

2. In a device of the character described, a main body having a horizontal support thereon along which a strip or web of photographic paper with the emulsion side down may pass, an exposure aperture in said support, roller means engaging said strip for advancing it along said support, a Geneva movement for driving said roller means, thereby causing said strip to be advanced in steps, means below said support and directed upwardly for impressing a latent photographic image onto said emulsion via said aperture while said strip is at rest, said last means including a source of illumination connected via a first switch to a source of current, means for imprinting an identification symbol on the face of said web opposite the face in which said photographic image is impressed, a serrated stationary blade mounted on said body at one end of said support and extending laterally of said strip, said blade being spaced from said aperture a predetermined distance, a rotary blade pivotally carried on said support in cooperative relation with said stationary blade and normally disengaged therefrom, said rotary blade having serrations formed therein to match the serrations in said stationary blade, solenoid means for arcuately moving said rotary blade into engagement with said stationary blade, an electrical circuit for said solenoid including a pair of normally open contacts, cam means moving in time with the rotary element of said Geneva movement for closing said contacts to effect the energizing of said solenoid and the shearing off of a portion of said strip containing said image, an electric motor for driving said Geneva movement and consequently said roller means, a spring-loaded brake on the shaft of said motor, a second solenoid in parallel with said motor and operatively connected to said brake, a circuit between said motor and said second solenoid and a source of current, said circuit including a momentary contact switch and a second switch in parallel with said momentary contact switch and controlled by said cam means and adapted to be closed by said cam means after said momentary contact switch has initially energized said motor and said second solenoid, and a foot pedal mechanically connected to means for actuating said first switch, said means for imprinting, and said momentary contact switch simultaneously.

ALBERT GAZZA.

REFERENCES CITED

The following references are of record in the file of this patent:

UNITED STATES PATENTS

| Number | Name | Date |
| --- | --- | --- |
| 1,704,794 | Fritts | Mar. 12, 1929 |
| 1,754,890 | Hershberg | Apr. 15, 1930 |
| 1,968,669 | Arnold | July 31, 1934 |
| 1,976,318 | Young | Oct. 9, 1934 |
| 2,035,524 | Black et al. | Mar. 31, 1936 |
| 2,125,388 | Monroe | Aug. 2, 1938 |
| 2,355,779 | Burleigh | Aug. 15, 1944 |
| 2,365,288 | Pask | Dec. 19, 1944 |